United States Patent [19]

Macdonald et al.

[11] Patent Number: 5,835,128
[45] Date of Patent: Nov. 10, 1998

[54] WIRELESS REDISTRIBUTION OF TELEVISION SIGNALS IN A MULTIPLE DWELLING UNIT

[75] Inventors: Perry A. Macdonald, Newbury Park; Lawrence Larson, Del Mar; Jeffrey B. Shealy; Michael Case, both of Thousand Oaks; Mehran Matloubian, Encino, all of Calif.

[73] Assignee: Hughes Electronics Corporation, El Segundo, Calif.

[21] Appl. No.: 757,881

[22] Filed: Nov. 27, 1996

[51] Int. Cl.⁶ .................................................. H04N 7/10
[52] U.S. Cl. ................... 348/8; 348/6; 455/6.1; 455/3.1
[58] Field of Search .................. 348/6, 8, 7, 12, 348/13; 455/8, 6.1, 3.1, 4.2, 5.1, 6.3; H04N 7/10

[56] References Cited

U.S. PATENT DOCUMENTS

| | | |
|---|---|---|
| 1,730,412 | 10/1929 | Duncan, Jr. . |
| 3,323,063 | 5/1967 | Walker et al. . |
| 4,183,054 | 1/1980 | Patisaul et al. ............................ 358/86 |
| 4,290,068 | 9/1981 | Bogner ...................................... 343/702 |
| 4,439,784 | 3/1984 | Furukawa et al. ........................ 348/9 |
| 4,545,075 | 10/1985 | Miller et al. ............................. 155/612 |
| 4,710,956 | 12/1987 | Rast .......................................... 380/20 |
| 4,747,160 | 5/1988 | Bossard ..................................... 455/33 |
| 5,073,930 | 12/1991 | Green et al. ............................... 380/10 |
| 5,173,775 | 12/1992 | Walker ....................................... 358/141 |
| 5,214,501 | 5/1993 | Cavallerano et al. .................... 358/12 |
| 5,272,525 | 12/1993 | Borchardt et al. ........................ 358/83 |
| 5,375,146 | 12/1994 | Chalmers ................................... 375/103 |
| 5,394,559 | 2/1995 | Hemmie et al. .......................... 455/5.1 |
| 5,412,720 | 5/1995 | Hoarty ....................................... 380/15 |
| 5,483,663 | 1/1996 | Tawil ......................................... 348/6 |
| 5,574,964 | 11/1996 | Hamlin ....................................... 348/8 |
| 5,610,916 | 3/1997 | Kostreski et al. ......................... 348/7 |
| 5,613,190 | 3/1997 | Hylton ........................................ 348/6 |

FOREIGN PATENT DOCUMENTS

| | | |
|---|---|---|
| 56-47183 | 4/1981 | Japan . |
| 63-257337 | 10/1988 | Japan . |
| 1-209825 | 8/1989 | Japan . |

OTHER PUBLICATIONS

Lenkurt Electric Co., Inc., *The Lenkurt Demodulator: The CATV Video Microwave Link*, vol. 20, No. 2, pp. 2–7 (Feb., 1971).

European Telecommunication Standard, "Digital broadcasting systems for television, sound and data services; Satellite Master Antenna Television (SMATV) distribution systems," TM 1285 Revision 1, Draft pr ETS 300 473, Nov., 1994, Source: EBU/ETSI JTC, Reference: DE/JTC–DVB–7–1, European Telecommunications Standard Institute, European Broadcasting Union, France, pp. 3–25 (1994).

*Primary Examiner*—Mark R. Powell
*Assistant Examiner*—Vivek Srivastava
*Attorney, Agent, or Firm*—V. D. Duraiswamy; W. K. Denson-Low

[57] ABSTRACT

A system for redistributing a television signal to a multiplicity of receiver units within a multiple dwelling unit (MDU) includes a main receiving antenna which receives a broadband television signal and a translation device that translates the broadband television signal into a different carrier frequency band. One or more broadcasting antennas, located at advantageous sites within the MDU, transmit the translated television signal along one or more walls of the MDU to be received by antennas associated with one or more individual receiver units. Each receiver unit demodulates the received television signal and provides a user-specified channel to a television set for display.

31 Claims, 3 Drawing Sheets

WIRELESS REDISTRIBUTION OF TELEVISION SIGNALS IN A MULTIPLE DWELLING UNIT

BACKGROUND OF THE INVENTION (a) Field of the Invention

The present invention relates generally to television signal distribution systems and, more particularly, to wireless television signal redistribution systems for distributing television signals received from a satellite or other signal source to a plurality of individual receiving units within one or more multiple dwelling units.

(b) Description of Related Art

Television signal distribution systems generally rely on either a cable network or on free-space propagation for delivering television signals to individual users or subscribers. Cable-based television systems transmit one or more individual television signals or "channels" over wire, while free-space propagation systems transmit one or more channels over-the-air, i.e., in a wireless manner. Most large-scale cable and wireless television signal distribution systems broadcast a broadband television signal having a plurality of individual television signals or channels modulated onto one or more carrier frequencies within a discernable frequency band.

Some wireless television signal distribution systems use one or more geosynchronous satellites to broadcast a broadband television signal to receiving units within a large geographic area, while other wireless systems are land-based, using one or more transmitters located within smaller geographic areas to broadcast to individual receiver units within those geographic areas. An example of a land-based "cellular" type television signal distribution system is disclosed in Bossard, U.S. Pat. No. 4,747,160. This system includes multiple television signal transmitting stations, each of which transmits a television signal to individual receivers spread throughout a limited geographic region, and is configured so that adjacent transmitting stations use modulation and frequency diversity to prevent interference.

Some cellular systems, such as those commonly referred to as LMDS (local multi-point distribution system) and MMDS (multi-channel, multi-point distribution system), use a land-based cellular-type transmitting setup to rebroadcast satellite signals at frequencies different than the frequencies used by the satellite. Each of the transmitters of an LMDS system typically transmits within a one to five mile radius cell while each of the transmitters of an MMDS system typically transmits within an approximately 30-mile radius cell.

Satellite television signal distribution systems generally include an earth station that compiles a number of individual television signals or channels into a broadband television signal, modulates a carrier frequency band with the broadband television signal and then transmits (uplinks) the modulated television signal to a geosynchronous satellite. The satellite amplifies the received television signal, shifts the television signal to a different carrier frequency band and transmits (downlinks) the frequency shifted television signal to earth for reception at individual receiving units.

The uplink and downlink broadband television signals of satellite systems are typically divided into a plurality of transponder signals, each having a plurality of individual channels. For example, analog satellite systems operating in the so-called "C-band," i.e., between about 3.7 GHz and about 4.2 GHz, typically broadcast ten, 500 MHz wide, transponder signals, each including twelve, 40 MHz wide, analog channels. Satellite systems may also broadcast a set of transponder signals at multiple polarizations, for example, a right-hand circular polarization (RHCP) and a left-hand circular polarization (LHCP), within the band of carrier frequencies associated with the satellite; effectively doubling the number of channels broadcast by the system.

Satellite television signal distribution systems exist for many frequency bands, including the so-called "Ku-band" which ranges from approximately 12 GHz to 18 GHz. The digital satellite system (DSS®) developed by DirecTV® uses an uplink signal having 16 RHCP transponder signals and 16 LHCP transponder signals modulated into the frequency band between about 17.2 GHz and about 17.7 GHz. Each of these 32 transponder signals is programmed-multiplexed to include data packets associated with anywhere from about five to eight individual television channels and is modulated according to a quadrature phase shift keying (QSPK) modulation scheme. The satellites associated with the DSS® system shift the uplink transponder signals to carrier frequencies ranging from approximately 12.2 GHz to approximately 12.7 GHz and transmit these frequency-shifted transponder signals back to earth for reception at each of a plurality of individual receiver units.

At each individual receiver unit, a receiving antenna, typically comprising a parabolic dish antenna, is pointed in the general direction of the transmitting satellite (or other transmitting location) to thereby receive the broadband television signal. Typically, such antennas include a low noise block (LNB) which filters and shifts the incoming signal to an intermediate frequency band, such as L-band which is between approximately 1.0 GHz and approximately 2.0 GHz. The DSS® system, in particular, shifts the signal received from the satellite to the frequency band between about 950 MHz and about 1450 MHz.

Typically, only the RHCP transponder signals or the LHCP transponder signals are mixed down to L-band, depending on which particular television channel a user is viewing. However, in systems having a two-channel LNB, both the RHCP and the LHCP transponder signals are shifted down to L-band and provided, via separate lines, to a set-top box or an integrated receiver and detector (IRD) associated with the receiver unit. At the IRD, an audio-visual program associated with a particular channel within one of the program-multiplexed transponder signals at L-band is decoded and is provided to a television for display on a television screen.

The receiving antennas or dishes associated with land-based or satellite-based wireless television signal distribution systems are typically large and cumbersome. For example, C-band satellite dishes are generally in the range of four to five feet in diameter and, therefore, require a large amount of operating space. As a result, it can be difficult, if not practically impossible, to install a receiving antenna for each individual unit within a multiple dwelling unit (MDU), such as an apartment, condominium or townhome complex, an office building, a recreational or sports facility, a multi-use building, etc. Even if a single dish antenna is used to provide satellite signals to all of the receiving units within an MDU, common L-band multi-user distribution solutions typically used to support such a system are fraught with installment and maintenance problems.

Reception of a particular satellite signal is made even more difficult in MDU's when, as is generally the case, some of the individual dwelling units therein do not have any walls or outside exposure facing the direction in which the receiving antenna must be pointed. In the past, as noted above, this disadvantage has been overcome by placing one or more receiving antennas on, for example, the roof of an MDU and then running cable to each of the individual dwelling units. Such a cabling system is illustrated in Japanese Patent Document No. 56-47183 for use in retransmitting CATV signals to multiple buildings in a small geographic area. In such systems however, significant roll-off or degradation of the television signals occurs due to the poor high frequency propagation properties of standard cable lines. Furthermore, these systems require the insertion of a dedicated cable throughout an MDU, typically at great expense to the landlord, tenant or property owner, or these systems must rely on existing cable networks which may prevent the use of these networks for other television signals, such as standard cable television signals.

SUMMARY OF THE INVENTION

The present invention relates to a system for redistributing a television signal, such as a broadband television signal, to a multiplicity of receiver units within one or more MDU's. According to one aspect of the present invention, a receiving antenna receives a broadband television signal from, for example, a satellite or a land-based transmitter. A mixer translates the broadband television signal into a different carrier frequency band and delivers the translated signal to one or more broadcasting antennas located at advantageous sites within the MDU. The broadcasting antennas transmit the translated signal along, for example, one or more outside walls of the MDU to be received by antennas associated with each of the individual receiver units within the MDU. The receiver units then demodulate the received broadband signal and provide user-specified channels to television sets for display.

According to another aspect of the present invention, a television signal redistribution system for redistributing a modulated television signal to a plurality of individual receivers at a local site includes a main receiver disposed at the local site to receive the modulated television signal and circuitry for translating the modulated television signal from a first frequency range to a second frequency range. The system also includes one or more transmitters that broadcast the frequency-translated television signal over-the-air for reception by a multiplicity of receiver units at the local site.

The translation circuitry may shift the modulated television signal to a third frequency range and then distribute this shifted signal to the one or more transmitters which, in turn, translate the shifted signal to the second frequency range. Different ones of the transmitters may translate the shifted signal to different portions of the second frequency range which, preferably, is near the 60 GHz band.

If desired the system may also include a device which inserts a further signal, such as a voice, digital or television signal into the frequency-translated television signal before transmitting the frequency-translated television signal to individual receiver units.

DESCRIPTION OF THE PREFERRED EMBODIMENTS

By the way of example, the television signal rebroadcasting system of the present invention will be described herein as being used with a satellite-based, DSS® system having a broadband television signal modulated onto a carrier frequency band centered around approximately 12.45 GHz. It is understood however, that the television signal rebroadcasting system of the present invention can be used with any other type of satellite or land-based wireless television distribution system (such as MMDS, LMDS, C-band, microwave, etc.) or, for that matter, with any cable-based television signal broadcasting system, including those which transmit broadband as well as narrowband television signals.

Figure 1:
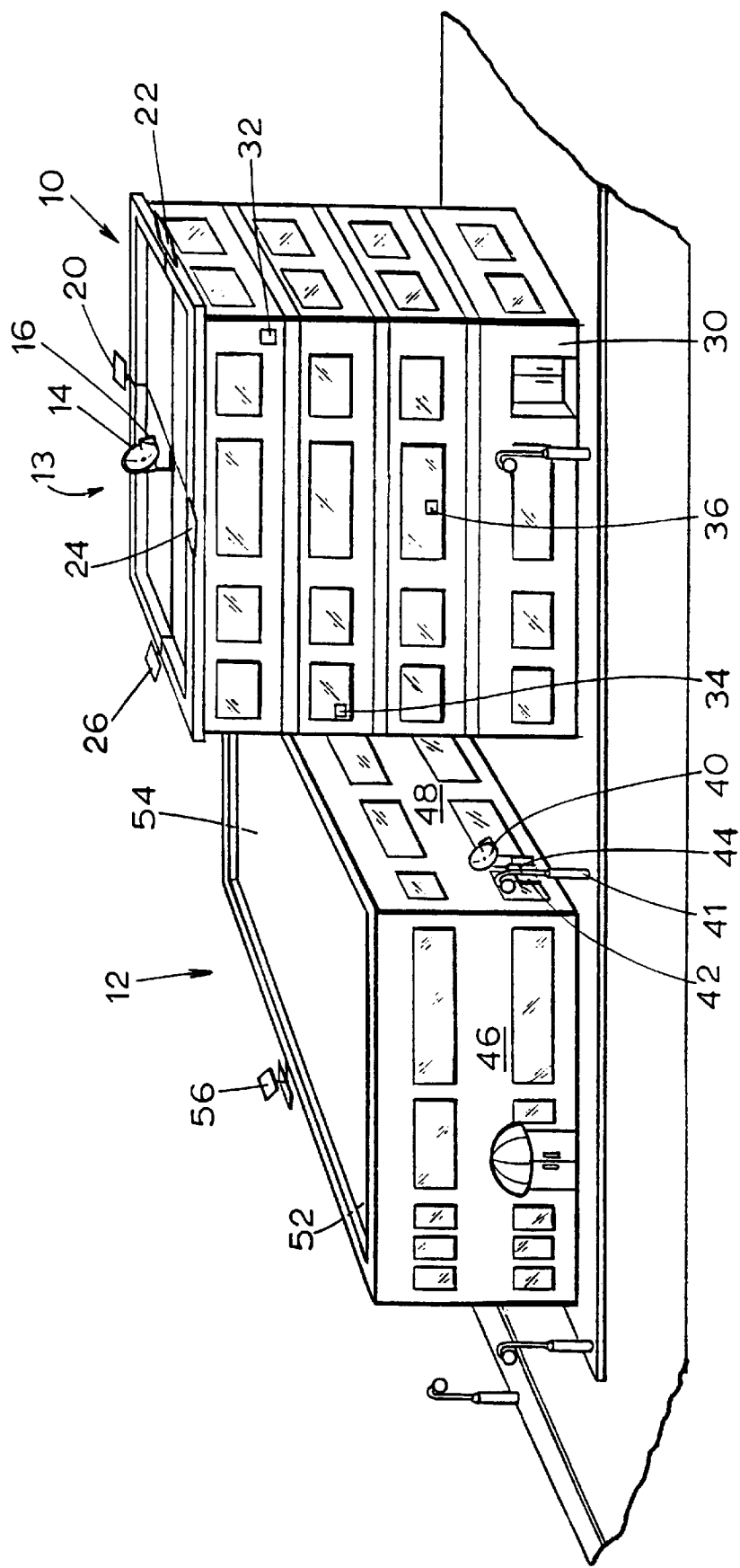
FIG. 1 is a diagram illustrating the wireless redistribution system of the present invention as installed on two adjacent MDU's.

Referring now to FIG. 1, the television signal broadcasting system according to the present invention is illustrated in use at one or more local sites having MDU's 10 and/or 12 therein. A local site is considered to be any geographic area of relatively small proportion, for example, on the size of a city block or less, containing one or more buildings or structures capable of having a plurality of individual receiving units therein. Each of the MDU's 10 and 12 may be any type of multiple dwelling unit including, for example, an apartment, townhome, or condominium complex, a hotel/motel, a multi-use building and/or any other type of building or structure in which multiple television signal receivers may be located.

The television signal rebroadcasting unit associated with the MDU 10 includes a main television signal receiver and wireless rebroadcasting unit 13 disposed on the roof of the MDU 10. The television signal receiver 13 includes a main receiving antenna 14, in the form of a parabolic dish antenna, pointed towards, for example, a satellite that transmits the DSS® broadband modulated television signal. An LNB 16 associated with the dish antenna 14 receives the modulated satellite signal reflected from the dish antenna, filters this signal and then mixes the filtered signal down to an intermediate frequency band, for example, the band between 950 MHz and 1450 MHz. If the television signal from the satellite includes a RHCP and a LHCP component (as the DSS® signal does), the LNB 16 shifts each of these components down to the intermediate frequency band. The LNB 16 provides these shifted, intermediate frequency television signals to each of, for example, four transmitters 20, 22, 24, and 26 through one or more cable connections.

Each of the transmitters 20, 22, 24, and 26 translates or shifts the intermediate frequency television signal to a second carrier frequency band, for example, to a region within the V-band (e.g., between about 59 GHz and about 64 GHz), and provides this frequency-translated signal to one or more transmission antennas. The transmission antennas associated with each of the transmitters 20, 22, 24, and 26, transmit the translated signal along, for example, one or more of the walls of the MDU 10 for reception by individual receiver units within the MDU 10. Thus, an antenna associated with the transmitter 24 may propagate the translated television signal along the front wall 30 of the MDU 10 to receiver antennas 32, 34, and 36 associated with individual receiver units within the MDU 10. In the same manner, antennas associated with the transmitters 20, 22, and 26 propagate translated television signals along an exterior wall of the MDU 10 to distribute this signal to other receiver antennas.

Each of the receiver antennas, such as the antennas 32, 34, and 36, is coupled to a receiver unit within the MDU 10. These receiver units demodulate the received translated (V-band) television signal and strip one or more of the channels therefrom for display on a television screen, as will be described in more detail with reference to FIG. 3.

The receiver antennas within the MDU 10 are configured to receive the translated (V-band) television signal and, as such, may be placed in any convenient location within the MDU 10 that allows reception of the signal broadcast by one of the transmitting antennas 20, 22, 24 or 26. If desired, a receiver antenna may be disposed on an exterior portion of one of the walls or windows of the MDU 10 including, for example, a window sill. If the transmitters 20, 22, 24, and 26 transmit with sufficient power, a receiver antenna may be located at the interior of the MDU 10, such as on an inner surface of a wall or a window. As will be evident to those skilled in the art, the position of each receiver antenna will be dependent upon the specific configuration of the system, including the transmitting frequency of the transmitting antennas, the position of the transmitting antennas, the power output by the transmitting antennas, the objects within a path between the transmitting and receiver antennas, the distance between the transmitting and receiver antennas, etc.

Although the main receiving antenna 14 is illustrated in FIG. 1 as located on the roof of the MDU 10, the main receiving antenna 14 may be placed in any other desired location which allows reception of a desired satellite or other television signal. Thus, for example, a main receiving antenna 40 associated with the MDU 12, is illustrated in FIG. 1 as being mounted on a lamp post 41 in front of the MDU 12 because placement of this antenna on the roof of the MDU 12 would cause that antenna to be "shadowed" from the television signal source by the MDU 10.

Similar to the antenna 14, the main receiving antenna 40 includes a two-channel LNB which mixes the broadband satellite signal centered at approximately 12.45 GHz down to L-band (i.e., from 950 MHz to 1450 MHz). The L-band signal is then provided to transmitters 42 and 44, which are also attached to the lamp post 41. Similar to the transmitters 20–26, the transmitters 42 and 44 translate the broadband television signal up to, for example, a portion of the V-band range, and broadcast this translated television signal along the walls 46 and 48 of the MDU 12 for reception by individual receivers within the MDU 12.

In the configuration illustrated in FIG. 1, the MDU 12 has walls 52 and 54 which are blocked or shadowed from the transmitters 20–26, 42, and 44 as well as from the satellite television signal source. As a result, the individual dwelling units having outside exposure only along the walls 52 and 54 of the MDU 12 will not be able to receive the 11.95 GHz satellite signal or the translated (V-band) signal emitted by any of the transmitters 20–26, 42 and 44. To correct this problem, a repeater transmitter 56 is located on the roof of the MDU 12. The repeater transmitter 56 includes a receiver antenna (similar to the antennas 32, 34, and 36) that receives the translated (V-band) signal from, for example, the transmitter 26. The repeater transmitter 56 also includes a transmitting antenna which rebroadcasts the received translated (V-band) signal along the wall 52 of the MDU 12 for reception within the individual dwelling units along that wall. A similar repeater transmitter can be placed on the MDU 12 to provide coverage of the wall 54 and/or any other shadowed locations. In this manner, each of the individual dwelling units within the MDU's 10 and 12 can receive all of the television channels within the broadband satellite signal received by the main receiving antennas 14 and 40 without having cable or wires run thereto.

Although FIG. 1 illustrates each of the MDU's 10 and 12 as having a separate main receiving antenna associated therewith, it will be understood that one main receiving antenna could be used with multiple MDU's. In other words, the television signal rebroadcasting system disclosed herein can be used at a local site including two or more MDU's (or other buildings) adjacent or near to each another and is not necessarily limited to use at a local site having only one building or MDU associated therewith. Thus, as an example, the transmitter 26 may be used to propagate the translated (V-band) signal to receiver antennas on the wall 48 of the MDU 12, while the main receiving antenna 40 can be replaced with a repeater transmitter (similar to the repeater transmitter 56) positioned to receive the translated (V-band) signal from the transmitter 24 or 26 and to retransmit that signal to the individual receiver units along the wall 46. As is evident, multiple MDU's and/or other buildings can share the main receiving antenna and transmitters in any other desired manner.

Conversely, any MDU may have multiple television signal rebroadcasting systems associated therewith, i.e., each MDU may have two or more local sites therein. In such a situation, an MDU will include multiple main receiving antennas and one or more transmitters associated with each of the main receiving antennas. If desired, the transmitters associated with the different main receiving antennas may mix the satellite signal up to a different region within the, for example, V-band, to provide frequency discrimination between the separate but adjacent rebroadcasting systems. Along this same line of reasoning, the transmitters 42 and 44 associated with the MDU 12 may transmit the translated (V-band) signal at a slightly different frequency band than the transmitters 20, 22, 24, and 26 associated with the MDU 10. Furthermore, if desired, the different transmitters associated with any one television signal redistribution system may transmit at a different region within, for example, the V-band frequency range, to provide frequency discrimination therebetween.

Although FIG. 1 illustrates four transmitting antennas associated with the MDU 14, any other number of transmitters may be placed in any desired locations on or adjacent the MDU 10 so long as these antennas are positioned to propagate the translated signal to desired locations within the MDU's 10 and 12. Furthermore, while the broadband television signal has been described as being mixed down to L-band and then back up to V-band for transmission over-the-air to the individual receiver antennas, any other desired frequencies could be used instead of the L-band and V-band frequencies. Also, if desired, the television signal received at the main receiving antenna could be immediately translated to, for example, the V-band range and sent out over wire to the transmitting antennas 20–26 without the use of the intermediate L-band conversion. However, this method is not preferred due to the poor high frequency transmission properties of cable lines.

It should also be noted that the V-band and particularly, the region of the V-band near 60 GHz, and, even more particularly, the frequency range from approximately 55 GHz to approximately 66 GHz is considered to be particularly useful for redistributing the incoming television signal over-the-air to individual receiver units because of the high free-space propagation losses which occur at this band. These losses, which are caused in large part by the absorption effects of oxygen, essentially limit the propagation range of the translated signal to receiver units within the MDU in which the system is being used and, possibly, MDU's or other buildings adjacent or near the MDU in which the system is being used, i.e., to the receiver units at a local site. Furthermore, the V-band translated signal is not likely to interfere with other over-the-air transmission systems which avoid this frequency range specifically because of its poor free-space propagation properties.

Use of the V-band between 59 GHz and 64 GHz is also considered useful because the United States Federal Communications Commission (FCC) has indicated that it will allow unlicensed use of this band. As a result, a manufacturer or user of the rebroadcasting system using this portion of the V-band will not have to obtain a license from the FCC.

While a preferred television signal rebroadcasting system for use with a DSS® satellite signal is described hereafter as using the portion of V-band extending from 59.45 GHz to 61.20 GHz, the particular band used to transmit the translated signal from the main antenna to the receiver antennas can use less than or more than this band. It is desirable, however, that at least a portion of the translated signal falls within the frequency band between about 55 GHz and about 66 GHz, where high propagation losses occur. Where longer propagation of the translated signal is needed, it may be best to use a band at the upper or lower part of the band extending from 55 GHz to 66 GHz, while in smaller MDU's, where long propagation distances are not needed, it may be best to center the translated signal at about 59 GHz, where the highest propagation losses occur.

Figure 2:
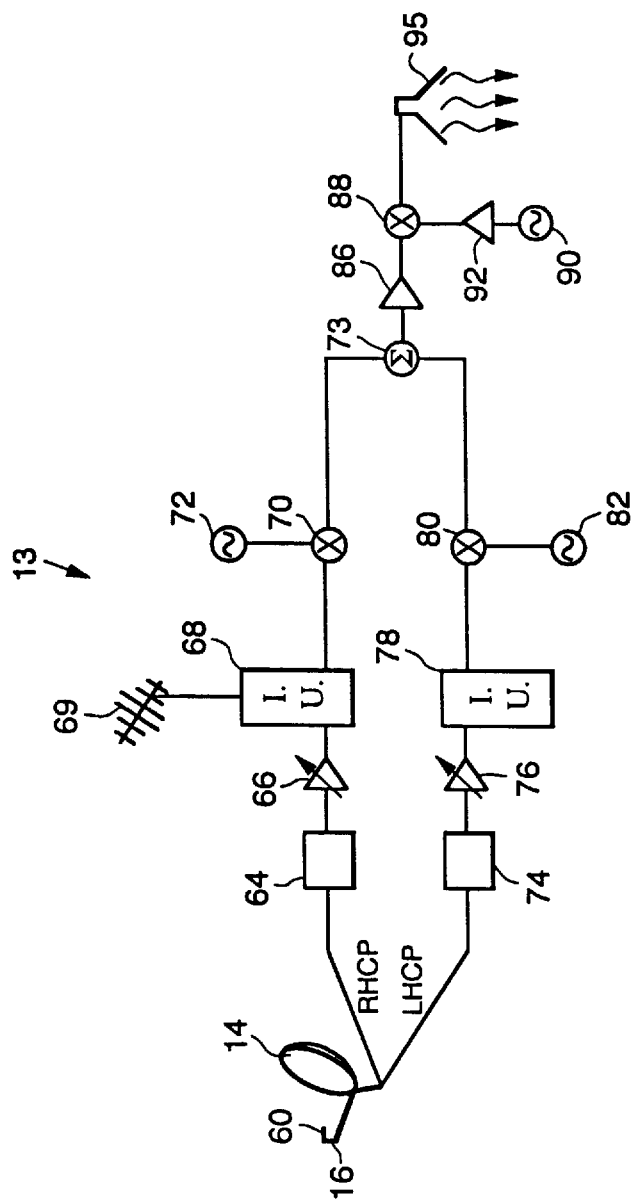
FIG. 2 is a block diagram of a main television signal receiver and wireless rebroadcasting unit according to the present invention.

Referring now to FIG. 2, the main television signal receiver and wireless rebroadcasting unit 13 is illustrated in detail. As noted above, the main receiving antenna 14 is designed to receive a DSS® satellite signal having a RHCP modulated component and a LHCP modulated component at the frequency band between approximately 12.2 GHz and approximately 12.7 GHz. The signal received by the antenna 14 is reflected into a receiving horn 60 and is provided to the two-channel LNB 16. Each of the LNB channels filters and then shifts one of the RHCP or the LHCP component of the received signal down to a portion of the L-band between approximately 0.95 GHz and approximately 1.45 GHz.

A first channel of the LNB 16 provides the RHCP component (shifted to L-band) through a bias tee 64 to an amplifier 66. The bias tee 64 provides a DC signal, typically 13 volts, to the LNB 16 to power the first channel. The amplifier 66 provides an amplified L-band signal to an insertion unit 68 which adds or inserts other signals, such as television signals, radio signals, voice signals, digital data signals, etc., to the L-band signal from the amplifier 66. The inserted signals may be delivered from, for example, an antenna 69 which receives a local television signal or from a modem, or any other receiving device. The insertion unit 68 may comprise any known type of signal insertion device such as a two-way power divider manufactured by Channel Master (part number 2271IFD) and may modulate the inserted signals into a frequency band which is higher or lower than that associated with the RHCP component delivered by the LNB 16, for example, between approximately 1.45 GHz and approximately 1.7 GHz.

The output of the insertion unit 68 is provided to a mixer 70 which, in turn, is coupled to a local oscillator (LO) 72 that oscillates at approximately 13.0 GHz. The mixer 70, which may be any standard mixer or frequency translation device, translates the L-band signal up to a frequency band between approximately 13.95 GHz and approximately 14.70 GHz and provides this signal to a summer 73.

Likewise, a second channel of the LNB 16 provides the LHCP component at L-band through a bias tee 74 to an amplifier 76. The bias tee 74 provides a DC signal, typically 17 volts, to the LNB 16 to power the second channel of the LNB 16. The amplifier 76 provides an amplified L-band signal to an insertion unit 78 that adds other television, radio, etc. signals thereto in a manner similar to the insertion unit 68. The output of the insertion unit 78 is provided to a mixer 80 that, in turn, is coupled to an LO 82 which oscillates at approximately 12.0 GHz. The mixer 80 translates the output of the insertion unit 78 up to a frequency band between approximately 12.95 GHz and approximately 13.70 GHz and provides this signal to the summer 73.

The summer 73 adds the signals from the mixers 70 and 80 to produce a signal centered around about 13.8 GHz having the RHCP component (of the satellite television signal) at a frequency band between approximately 13.95 GHz and approximately 14.7 GHz and having the LHCP component (of the satellite television signal) at a frequency band between approximately 12.95 GHz approximately and 13.7 GHz. In this manner, the RHCP and LHCP components of the original satellite signal are shifted in frequency with respect to one another to provide frequency discrimination between the two components.

An amplifier 86 amplifies the output of the summer 74 and provides this amplified signal to a tripler 88. The tripler 88, uses the output of a 15.5 GHz LO 90, as amplified by an amplifier 92, to triple the frequency of the signal from the summer 73 and, thereby, produces the frequency-translated television signal. Preferably, this translated signal is at a carrier frequency range near or around 60 GHz, e.g., going from approximately 59.45 to approximately 61.2 GHz. The tripler 88 may comprise any known or desired device which triples the carrier frequency of a modulated signal including, for example, any known harmonic upconverter.

The 60 GHz translated television signal is provided to a transmitting antenna 95 which, in turn, broadcasts the translated 60 GHz signal to any number of individual receiver units. As is evident, the tripler 88 may send the translated television signal to any number of transmitting antennas. In the preferred embodiment each transmitter, such as any of the transmitters 20–26, 42, and 44, includes all of the elements illustrated in FIG. 2 except the antenna 14, the receiving horn 60, the LNB 16, and the bias tees 64 and 74 so that transmission from the main receiving antenna 14 to the transmitting antennas is performed at L-band instead of at high frequencies such as V-band. Furthermore, while FIG. 2 illustrates conversion up to V-band using a tripler 88 and mixers 70 and 80, it is understood that any other single or multistage translation device or mixer, such as a quadrupler, could be used instead.

Figures 3, 4:
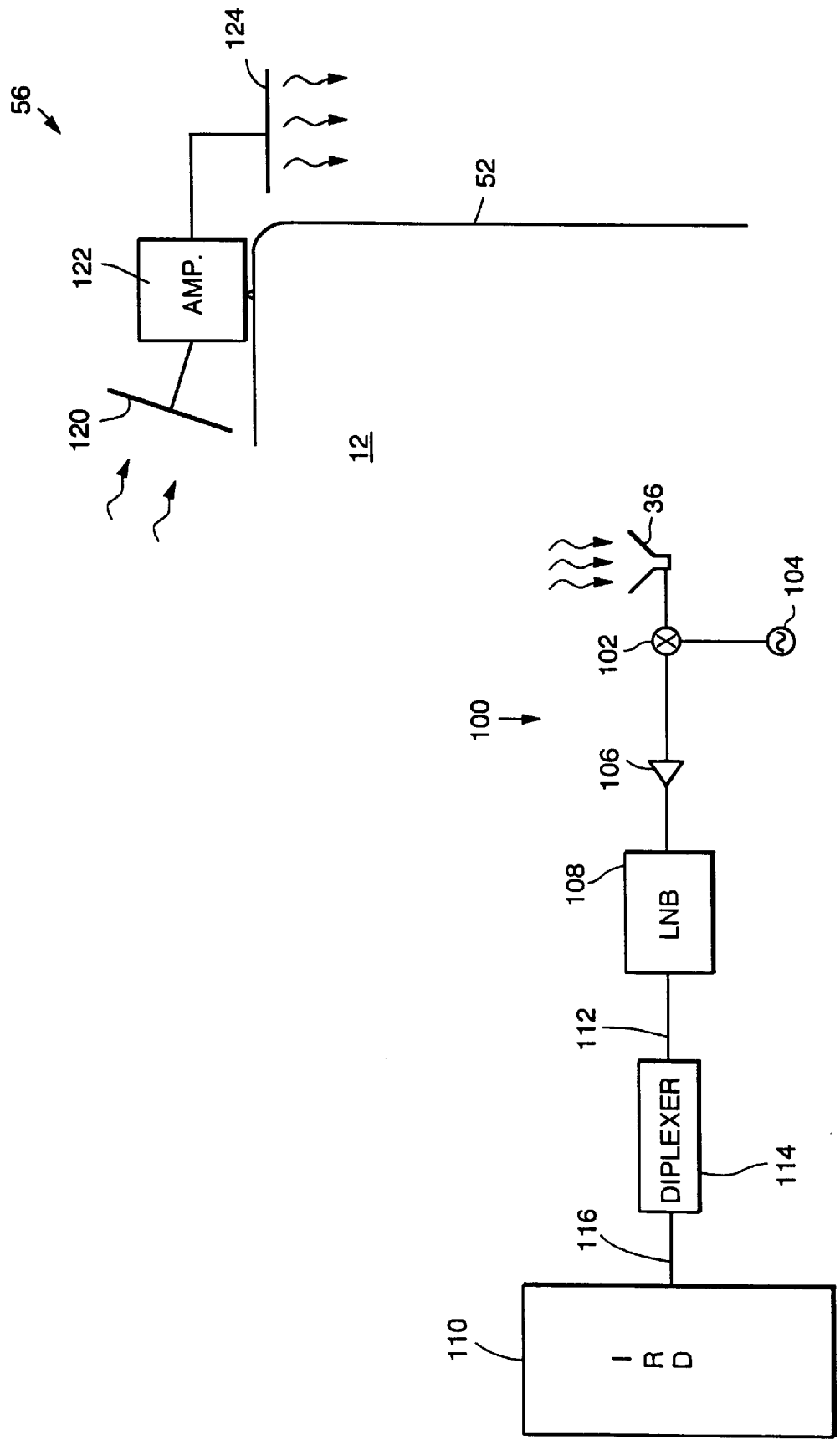
FIG. 3 is a block diagram of an individual receiver unit according to the present invention.
FIG. 4 is a block diagram of a repeater transmitter illustrated in FIG. 1.

Referring now to FIG. 3, an individual receiver unit 100 associated with one of the individual dwelling units of the MDU 10 is illustrated. A receiving antenna (illustrated as the receiving antenna 36 of FIG. 1) is adapted to receive the frequency range transmitted by the transmitting antenna 95, e.g., between approximately 59.45 GHz and approximately 61.20 GHz, and provides the received translated television signal to a mixer 102. The mixer 102, which is coupled to an LO 104 that oscillates at approximately 16.25 GHz, mixes the received translated 60 GHz signal down to a frequency band between approximately 10.7 GHz and approximately 12.45 GHz. An amplifier 106 amplifies the output of the mixer 102 and provides this amplified signal to a switchable wide-band, low noise block 108, which may comprise, for example, a Ku-band/Y-band amplifier (part number 150018), manufactured by California Amplifier.

The low noise block 108 translates one of two bands of frequencies within the 12 GHz signal down to L-band, e.g., between approximately 0.95 GHz and approximately 1.45 GHz, and blocks or filters the other of the bands. In an exemplary embodiment, the low noise block 108 passes the signals at a first frequency band between approximately 10.7 GHz and 11.45 GHz (which correspond to the LHCP component of the signal received by the antenna 14 of FIG. 2 along with the additional signals added thereto by the insertion unit 78) or passes the signals at a second frequency band between approximately 11.7 GHz and 12.45 GHz (which correspond to the RHCP component of the signal received by the antenna 14 of FIG. 2 along with the additional signals added thereto by the insertion unit 68) and down-converts the passed band of frequencies to L-band using any known or desired technique, such as mixing.

The low noise block 108 switches between the first and second bands based upon a DC input signal delivered from an IRD or set-top box 110 through a line 112. For example, if the user wants to view a television signal that is provided on a channel within the RHCP component of the satellite television signal, the low noise block 108 switches to the second frequency band to provide the IRD 110 with the band of frequencies containing the desired television signal. Thus, in essence, the mixer 102, LO 104 and low noise block 108 translate the received translated 60 GHz signal back to L-band so that the signal delivered to the IRD 110 appears to the IRD 110 as if it was delivered directly from the LNB 16 of the main receiving antenna 14.

The low noise block 108 provides the down-converted first or second band of signals through the line 112, through an insertion port 114, which may comprise a standard diplexer that provides a connection to a UHF/VHF antenna, and then through another line 116 to the IRD 110. As will be evident to those of ordinary skill in the art, the IRD 110 demodulates the received signal, strips a particular television signal from the provided band of television signals according to the channel selected by a user and delivers this signal to a television for use in generating a display on a television screen. The IRD 110 may be any desired type of IRD or set-top box, such as any of those associated with the DSS® system, e.g., those manufactured by Sony, Thompson, Hughes Network Systems, or RCA, or any other set-top box manufactured for the particular satellite or land-based television distribution system for which the wireless redistribution system is being used.

Referring now to FIG. 4, the repeater transmitter 56 of FIG. 1 is illustrated in detail. Essentially, the repeater transmitter 56 includes a receiving antenna 120 configured and positioned to receive the V-band translated television signal generated by any of the transmitters of FIG. 1. The received V-band signal is provided to an amplifier 122 and then to a transmitting antenna 124 which is positioned or directed to transmit the amplified V-band signal to one or more receiver units along, for example, the wall 52 of the MDU 12. Although the amplifier 122 may amplify the received translated signal at the frequency band at which this signal is transmitted, e.g., V-band, it is considered desirable to have the amplifier 122 down-convert the received translated signal to an intermediate frequency, such as Ku-band (preferably between approximately 11.7 GHz and approximately 12.2 GHz), amplify the signal at the intermediate frequency and then up-convert the signal back to, for example, V-band, for retransmission by the transmitting antenna 124. This conversion process avoids the use of transistors at V-band where it is very difficult to obtain commercially viable transistors.

As noted above, the received television signal can be translated and rebroadcast to be transmitted to individual receiver units at any desired frequency other than the preferred V-band or 60 GHz band to provide for wider geographical coverage or to take advantage of any desirable reflection or transmission properties available at those other frequencies. Furthermore, although the transmitting antennas described herein are situated to propagate the translated television signal along walls (which enhances the distance these signals will propagate at the 60 GHz band), the transmitting antennas may be situated to propagate in any other desired or advantageous manner, such as using direct line-of-sight, reflection, etc.

While the present invention has been described with reference to specific examples, which are intended to be illustrative only, and not to be limiting of the invention, it will be apparent to those of ordinary skill in the art that changes, additions and/or deletions may be made to the disclosed embodiments without departing from the spirit and scope of the invention.

What is claimed is:

1. A television signal redistribution system for redistributing a modulated television signal to a plurality of individual receivers at a local site, the redistribution system comprising:

a main receiver disposed at the local site for receiving the modulated television signal;

means for translating the modulated television signal from a first frequency range to a second frequency range to produce one or more frequency-translated television signals; and a plurality of transmitters connected to the translating means, each of which broadcasts one of the one or more frequency-translated television signals over-the-air for reception by a multiplicity of receiver units at the local site.

2. The television signal redistribution system of claim 1, wherein the translating means includes a plurality of means for developing the one or more frequency-translated television signals, wherein each of the plurality of developing means includes means for shifting the modulated television signal from the first frequency range to a portion of the second frequency range.

3. The television signal redistribution system of claim 2, wherein the shifting means associated with one of the plurality of developing means shifts the modulated television signal from the first frequency range to a first portion of the second frequency range and the shifting means associated with a second of the plurality of developing means shifts the modulated television signal from the first frequency range to a second portion of the second frequency range which is different than the first portion of the second frequency range.

4. The television signal redistribution system of claim 1, further including a plurality of receiver units at the local site, each having an antenna for receiving a particular one of the one or more transmitted frequency-translated television signals and a demodulator that demodulates the received particular one of the frequency-translated television signals to produce a television display signal adapted to generate a display on a television screen.

5. The television signal redistribution system of claim 4, wherein the translating means includes means for shifting the modulated television signal from the first frequency range to a band within a third frequency range and further means for shifting the shifted modulated television signal to the second frequency range to produce the frequency-translated television signal, and wherein each of the demodulators includes further means coupled to the antenna for translating the received particular one of the one or more transmitted frequency-translated television signals to the third frequency range to produce another translated television signal and a demodulator device that demodulates the another translated television signal to produce the television display signal.

6. The television signal redistribution system of claim 1, further including a repeater unit located at the local site, wherein the repeater unit includes a receiving antenna for receiving one of the one or more transmitted frequency-translated television signals and a further transmitter that rebroadcasts the received one of the one or more frequency-translated television signals.

7. The television signal redistribution system of claim 1, wherein the modulated television signal has a right-hand circular polarized component at the first frequency range and a left-hand circular polarized component at the first frequency range and wherein the translating means includes first means for shifting the right-hand circular polarized component to a first portion of the second frequency range and second means for shifting the left-hand circular polarized component to a second portion of the second frequency range, and wherein the first and second portions of the second frequency range are non-overlapping.

8. The television signal redistribution system of claim 1, wherein the second frequency range is near 60 gigahertz.

9. The television signal redistribution system of claim 1, wherein the second frequency range is within a frequency band between approximately 55 gigahertz and approximately 66 gigahertz.

10. The television signal redistribution system of claim 1, wherein the second frequency range is within a frequency band between approximately 59 gigahertz and approximately 64 gigahertz.

11. The television signal redistribution system of claim 1, wherein the translating means includes means for combining a further signal to the one or more frequency-translated television signals.

12. The television signal redistribution system of claim 11, further including a local antenna for receiving a local television signal and wherein the further signal comprises the local television signal.

13. The television signal redistribution system of claim 1, wherein the local site includes a plurality of walls and wherein each of the plurality of transmitters includes a transmitting antenna positioned to propagate an associated one of the one or more frequency-translated television signals along one of the plurality of walls.

14. The television signal redistribution system of claim 1, wherein the modulated television signal comprises a satellite television signal.

15. The television signal redistribution system of claim 1, wherein the center frequency of the second frequency range is greater than the center frequency of the first frequency range.

16. The television signal redistribution system of claim 1, wherein the main receiver includes an antenna adapted to receive an over-the-air television signal.

17. A television signal redistribution system for redistributing a modulated television signal to an individual receiver at a local site, the redistribution system comprising:

a main antenna disposed at the local site for receiving the modulated television signal;

means for translating the modulated television signal from a first frequency range to a second frequency range to produce a translated television signal;

a transmitter connected to the translating means that broadcasts the translated television signal over-the-air at the local site; and a receiver unit positioned at the local site, including a receiver antenna for receiving the transmitted translated television signal at the second frequency range and a demodulator that demodulates the received translated television signal to produce a television display signal adapted to generate a display on a television.

18. The television signal redistribution system of claim 17, wherein the translating means includes means for shifting the modulated television signal from the first frequency range to a third frequency range and further means for shifting the shifted modulated television signal to the second frequency range to produce the translated television signal and wherein the demodulator includes further means coupled to the antenna for translating the received translated television signal to the third frequency range to produce a shifted received translated television signal and a demodulator device that demodulates the shifted received translated television signal to produce the television display signal.

19. The television signal redistribution system of claim 17, further including a repeater unit located at the local site, wherein the repeater unit includes a receiving antenna for receiving the transmitted translated television signal and a further transmitter that rebroadcasts the translated television signal received by the receiving antenna.

20. The television signal redistribution system of claim 17, wherein the second frequency range is near 60 gigahertz.

21. The television signal redistribution system of claim 17, wherein the second frequency range is in a frequency band between about 55 gigahertz and about 66 gigahertz.

22. The television signal redistribution system of claim 17, wherein the second frequency range is in a frequency band between about 59 gigahertz and about 64 gigahertz.

23. The television signal redistribution system of claim 17, wherein the translating means includes means for combining a further signal with the modulated television signal to produce the translated television signal.

24. The television signal redistribution system of claim 17, further including second means for translating the modulated television signal from the first frequency range to the second frequency range to produce a second translated television signal and a second transmitter connected to the second translating means that broadcasts the second translated television signal over-the-air at the local site.

25. The television signal redistribution system of claim 24, wherein the translating means translates the modulated television signal from the first frequency range to a first portion of the second frequency range and wherein the second translating means translates the modulated television signal from the first frequency range to a second portion of the second frequency range which is different than the first portion of the second frequency range.

26. A method of redistributing a modulated television signal to a plurality of individual receivers at a local site, comprising the steps of:

detecting the modulated television signal;

translating the detected television signal from a first frequency range to a second frequency range to produce a translated television signal;

broadcasting the translated television signal over-the-air at the local site;

receiving the broadcasted translated television signal at a plurality of locations at the local site; and demodulating the received translated television signal at one or more of the plurality of locations to produce a television display signal adapted for use in generating a display on a television.

27. The method of redistributing a television signal of claim 26, wherein the step of translating includes the steps of shifting the detected television signal from the first frequency range to a third frequency range and shifting the shifted detected television signal to the second frequency range to produce the translated television signal, and wherein the step of demodulating includes the steps of translating the received translated television signal to the third frequency range to produce another translated television signal and demodulating the another translated television signal to produce the television display signal.

28. The method of redistributing a television signal of claim 26, wherein the step of translating includes the step of translating the detected television signal to a frequency range near 60 gigahertz.

29. The method of redistributing a television signal of claim 26, wherein the step of translating includes the step of translating the detected television signal to a frequency range within a frequency band between about 55 gigahertz and about 66 gigahertz.

30. The method of redistributing a television signal of claim 26, wherein the step of translating includes the step of translating the detected television signal to a frequency range within a frequency band between about 59 gigahertz and about 64 gigahertz.

31. The method of redistributing a television signal of claim 26, further including the step of combining a further signal with the translated television signal before the step of broadcasting the translated television signal.

* * * * *